(12) United States Patent
Novo Diaz et al.

(10) Patent No.: US 10,623,504 B2
(45) Date of Patent: Apr. 14, 2020

(54) APPARATUS AND METHOD FOR MANAGING CLIENT DEVICES

(71) Applicant: Telefonaktiebolaget LM Ericsson (publ), Stockholm (SE)

(72) Inventors: Oscar Novo Diaz, Helsinki (FI); Nicklas Beijar, Kirkkonummi (FI); Domenico D'Ambrosio, Casalnuovo di Napoli (IT); Jaime Jiménez, Helsinki (FI); Miika Komu, Helsinki (FI); Mert Ocak, Helsinki (FI); Patrik Salmela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 262 days.

(21) Appl. No.: 15/306,296

(22) PCT Filed: Oct. 22, 2014

(86) PCT No.: PCT/EP2014/072669
§ 371 (c)(1),
(2) Date: Oct. 24, 2016

(87) PCT Pub. No.: WO2015/161903
PCT Pub. Date: Oct. 29, 2015

(65) Prior Publication Data
US 2017/0048336 A1     Feb. 16, 2017

Related U.S. Application Data

(60) Provisional application No. 61/984,311, filed on Apr. 25, 2014.

(51) Int. Cl.
G06F 15/16     (2006.01)
H04L 29/08     (2006.01)
H04L 29/06     (2006.01)

(52) U.S. Cl.
CPC ............ *H04L 67/16* (2013.01); *H04L 67/02* (2013.01); *H04L 67/12* (2013.01); *H04L 67/125* (2013.01); *H04L 67/42* (2013.01)

(58) Field of Classification Search
USPC ........................................................ 709/217
See application file for complete search history.

(56) References Cited

U.S. PATENT DOCUMENTS 5,864,486 A *  1/1999  Deming ............... G06F 17/5054
                                                716/117
7,155,515 B1 * 12/2006 Brown ................ H04L 67/1008
                                                709/226
(Continued)

FOREIGN PATENT DOCUMENTS

WO       2014053887 A1    4/2014

OTHER PUBLICATIONS

European Communication issued in Application No. 14 787 179.2 dated Jul. 7, 2017, 8 pages.
(Continued)

*Primary Examiner* — Alicia Baturay
(74) *Attorney, Agent, or Firm* — Rothwell, Figg, Ernst & Manbeck, P.C.

(57) ABSTRACT

A relay module (30) for use in a lightweight machine to machine (LWM2M) communication network comprises a first interface module (31) for interfacing with one or more server devices, and a second interface module (33) for interfacing with a plurality of client devices. A processing unit (35) is adapted to establish at least one group object instance, wherein each group object instance is used to control communication between a server device and a group of client devices.

23 Claims, 9 Drawing Sheets

(56) References Cited

U.S. PATENT DOCUMENTS

| | | | | |
|---|---|---|---|---|
| 7,209,977 | B2* | 4/2007 | Acharya | H04L 29/12009 370/395.3 |
| 7,395,335 | B2* | 7/2008 | Brown | H04L 67/1014 709/203 |
| 7,406,540 | B2* | 7/2008 | Acharya | H04L 29/12009 709/240 |
| 7,562,145 | B2* | 7/2009 | Aiken, Jr. | G06F 9/5033 709/227 |
| 7,702,800 | B2* | 4/2010 | Copeland | H04L 29/06 709/219 |
| 7,904,561 | B2* | 3/2011 | Chan | G06Q 30/0217 705/14.19 |
| 8,527,656 | B2* | 9/2013 | Baker | H04L 65/1046 709/239 |
| 8,543,665 | B2* | 9/2013 | Ansari | H04L 29/12169 709/218 |
| 9,098,335 | B2* | 8/2015 | Muthiah | G06F 9/5011 |
| 9,432,281 | B2* | 8/2016 | Iovanna | H04L 45/64 |
| 9,569,587 | B2* | 2/2017 | Ansari | H04L 63/083 |
| 9,680,692 | B2* | 6/2017 | Liu | H04L 67/10 |
| 9,736,273 | B2* | 8/2017 | Savolainen | H04L 51/38 |
| 9,787,499 | B2* | 10/2017 | Miller | H04L 12/4633 |
| 10,257,800 | B2* | 4/2019 | Kim | H04W 4/70 |
| 2002/0143953 | A1* | 10/2002 | Aiken, Jr. | H04L 67/1008 709/227 |
| 2008/0299969 | A1* | 12/2008 | Shatsky | H04W 60/06 455/435.1 |
| 2011/0213871 | A1 | 9/2011 | DiGirolamo et al. | |
| 2013/0061054 | A1* | 3/2013 | Niccolai | G06F 21/10 713/171 |
| 2013/0198340 | A1 | 8/2013 | Ukkola et al. | |
| 2014/0067902 | A1* | 3/2014 | Wang | H04L 67/02 709/201 |
| 2017/0208139 | A1* | 7/2017 | Li | H04W 4/70 |
| 2017/0223479 | A1* | 8/2017 | Ly | H04W 4/70 |

OTHER PUBLICATIONS

International Search Report and Written Opinion dated Jun. 10, 2016 in International No. PCT/EP2014/072569, 8 pages.

Shelby, Z., et al. "Constrained Application Protocol (CoAP)", CoRE Working Group, Jun. 28, 2013, 118 pages.

Open Mobile Alliance, "Lightweight Machine to Machine" Technical Specification, Candidate Version 1.0—Dec. 2013, 104 pages.

European Communication issued in Application No. 14 787 179.2 dated Feb. 19, 2018, 7 pages.

* cited by examiner

APPARATUS AND METHOD FOR MANAGING CLIENT DEVICES

CROSS-REFERENCE TO RELATED APPLICATION(S)

This application is a 35 U.S.C. § 371 National Phase Entry Application from PCT/EP2014/072669, filed Oct. 22, 2014, and designating the United States, which claims priority to U.S. Provisional Application No. 61/984,311, filed on Apr. 25, 2014. The contents of both applications are incorporated by reference.

TECHNICAL FIELD

The present disclosure relates generally to managing client devices, for example machine-to-machine (M2M) type devices and, more particularly, to methods and apparatus for managing a group of M2M type devices.

BACKGROUND

The Constrained Application Protocol (CoAP) is a specialized web transfer protocol designed for machine-to-machine (M2M) applications in constrained nodes and constrained networks. In the present context, the term "constrained" refers to limitations in CPU, memory, and power resources that are inherent to devices which are expected to be used for the Internet-of-Things (IoT). CoAP provides a request-response based architecture between endpoints, where the communication is typically performed between a CoAP Server and one or more CoAP Clients over the User Datagram Protocol (UDP).

CoAP is designed to easily work along with the Hypertext Transfer Protocol (HTTP) for integration with the current Web, while adding additional features such as multicast support, very low overhead, and simplicity for constrained environments. One of the available extensions to CoAP enables CoAP clients to observe resources from CoAP servers, i.e. it enables CoAP servers to notify CoAP clients. Such an extension enables server-initiated communication in constrained networks using CoAP.

Open Mobile Alliance Device Management (OMA-DM) Lightweight is a light and compact device management protocol designed for M2M networks, which includes device management and service enablement for lightweight M2M (LWM2M) devices. Further details of OMA-DM LW can be found in the "Lightweight Machine to Machine Technical Specification", Candidate Version 1.0, 10 Dec. 2013, OMA-TS-LightweightM2M-V1_0-20131210-C.

Being designed for constrained networks, OMA-DM LW can run CoAP over both UDP and Short Message Service (SMS) bindings. This enables OMA-DM LW to be applicable with any constrained device or network using CoAP.

LWM2M defines three logical components:

LWM2M Server: manages LWM2M Clients.

LWM2M Client: contains various Objects with different Resources. It executes commands sent by the LWM2M Servers and then reports the results for device management and the service enablement.

LWM2M Bootstrap Server: used during bootstrap procedures, and takes care of the initial configuration of the LWM2M Clients.

In addition, four interfaces are defined between these logical components:

Client Registration: enables LWM2M Clients to register with one or more LWM2M servers after bootstrapping of the device.

Bootstrap: used by the LWM2M Bootstrap Server to set initial configurations on the LWM2M Client.

Device Management and Service Enablement: allows the LWM2M Server to perform the device management and M2M service enablement. Over this interface, the LWM2M Server can send operations to the LWM2M Client and obtain the response of the operations from the LWM2M Client. Both services and new management routines are set using Objects with the appropriate executable privileges set.

Information Reporting: this interface allows the LWM2M Client to report resource information to the LWM2M Server in the form of Notifications. Information Reporting can be triggered periodically using an Observe message, or by events, depending of the logic in the client.

The relationship between the various operations performed over these interfaces, and their uplink or downlink direction, are listed in Table 1 below:

TABLE 1

| Interface | Direction | Operation |
| --- | --- | --- |
| Bootstrap | Uplink | Request Bootstrap |
| Bootstrap | Downlink | Write, Delete |
| Client Registration | Uplink | Register, Update, De-Register |
| Device Management and Service Enablement | Downlink | Create, Read, Write, Delete, Execute, Write Attributes, Discover |
| Information Reporting | Downlink | Observe, Cancel Observation |
| Information Reporting | Uplink | Notify |

After a bootstrap procedure has been completed, an LWM2M Client registers with an LWM2M Server following a client registration interface flow, as defined in the LWM2M Technical Specifications. The registration is performed when the LWM2M Client sends a "Register" operation to the LWM2M Server.

Periodically or based on certain events within the LWM2M Client or initiated by the LWM2M Server, the LWM2M Client updates its registration information with the LWM2M Server. The default value of updating the registration is every 86400 seconds (24 hours).

Referring to FIG. 1, the result of the above is that a number of client devices $10_1$ to $10_n$ communicate directly with a server device 20. The process of client devices $10_1$ to $10_n$ registering and updating their information so frequently can be very cumbersome for some server devices 20. In many situations where server devices 20 will be handling thousands or even millions of client devices 10, the process of registration and updating the registration can be extremely time consuming and costly.

Moreover, the management of a large number of client devices $10_1$ to $10_n$ can be a difficult task for the administrator (or administrators) of a server device 20, for example when having to keep track of the client devices 10 that join or leave a network.

SUMMARY

It is an aim of the present invention to provide a method and apparatus which obviate or reduce at least one or more of the disadvantages mentioned above.

According to a first aspect of the present invention there is provided a relay module for use in a lightweight machine to machine (LWM2M) communication network. The relay module comprises a first interface module for interfacing with one or more server devices, and a second interface module for interfacing with a plurality of client devices. A processing unit is adapted to establish at least one group object instance, wherein each group object instance is used to control communication between a server device and a group of client devices.

According to another aspect of the present invention there is provided a method of managing client devices in a lightweight machine to machine (LWM2M) communication network. The method comprises providing a relay module for interfacing on the one side with one or more server devices, and on the other with a plurality of client devices. The method comprises establishing at least one group object instance, and controlling communication between a server device and a group of client devices using a group object instance.

According to another aspect of the present invention, there is provided a server device for use in a lightweight machine to machine (LWM2M) communication network. The server device comprises a processing unit adapted to receive a register request message from a client device, determine if the client device is a relay module capable of handling a group of client device, and if so, send server information to the relay module, for enabling a relay module to group client devices.

According to another aspect, there is provided a server device comprising a relay module as defined in the appended claims.

According to another aspect, there is provided a client device comprising a relay module as defined in the appended claims.

According to another aspect, there is provided a bootstrap server for use in a lightweight machine to machine communication network. The bootstrap server comprises a processing unit configured to receive a register request from a client device, and direct the register request from the client device to a relay node, for enabling the relay node to act as an interface between a server device and a plurality of client devices.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The embodiments described below present solutions for managing client devices, such as machine to machine (M2M) type devices, and in particular to managing a group of client devices, for example in the form of an extension to the Open Mobile Alliance (OMA) Device Management (DM) Lightweight protocol (OMA-DM LW). As will be described in more detail below, embodiments of the invention introduce a new group object, and a relay module for providing group management of client devices using the new group object.

In the embodiments below the term "server device" is intended to embrace any form of server, including a lightweight machine-to-machine server (LWM2MServer). Likewise, the term "client device" in intended to embrace any form of client device, including a lightweight machine-to-machine client (LWM2M Client).

Figure 1:
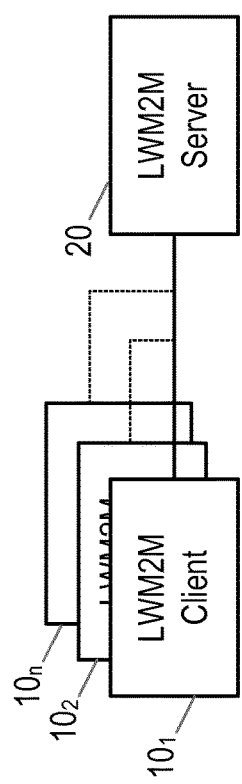
FIG. 1 shows an example of a known arrangement.
Figure 2:
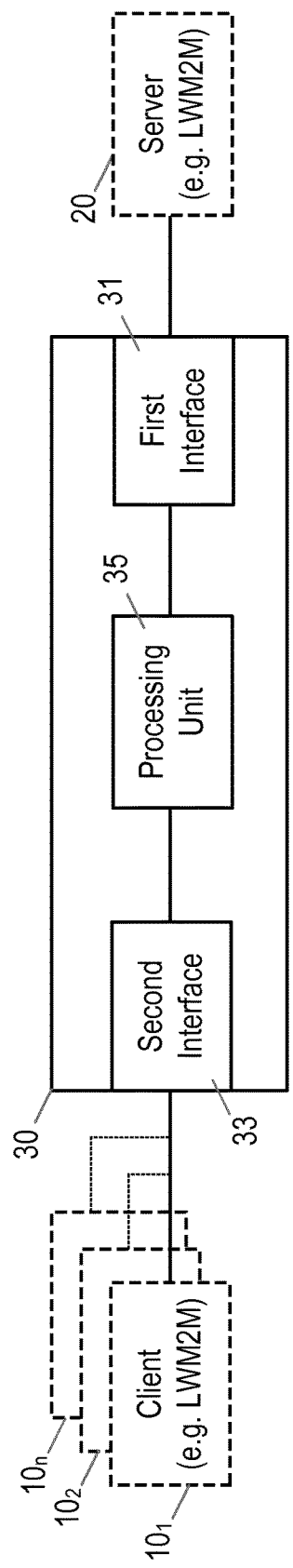
FIG. 2 shows an example of a relay module according to an embodiment of the present invention.

FIG. 2 shows a relay module 30 according to an embodiment of the present invention, for use in a lightweight machine to machine (LWM2M) communication network. The relay module 30 comprises a first interface module 31 for interfacing with one or more server devices (for example a server 20). The relay module 30 comprises a second interface module 33 for interfacing with a plurality of client devices 10. A processing unit 35 is adapted to establish at least one group object instance, wherein each group object instance controls communication between a server device (for example server device 20) and a group of client devices (for example client devices $10_1$ to $10_n$).

The first interface module 31 may comprise for example a LWM2M client implementation, i.e. such that the relay module 30 appears as a LWM2M client device to the server device 20, such as a LWM2M server. The second interface module 33 may comprise for example a LWM2M server implementation, i.e. such that the relay module 30 appears as a LWM2M server device to the group of client devices $10_1$ to $10_n$, such as LWM2M clients Thus, according to an embodiment of the invention, there is provided a relay module, wherein the relay module is an entity that may contain both LWM2M client and server implementations, for acting as a gateway between a managing LWM2M server and a group of LWM2M clients. It is noted that the relay module may form part of a relay node, or some other node provided between a server device and a plurality of client devices. Alternatively, a relay module may form part of a particular server device, or part of a particular client device which adopts the role of a relay entity for a group of client devices. For example, in a local Wireless Sensor Network (WSN) with multiple LWM2M client devices, one of the client devices can also take the role of the relay module.

The relay module has an advantage of being able to reduce and ease the load of messages between the LWM2M client devices and a LWM2M server device.

According to an embodiment of the present invention, a relay module is able to automatically register, update and group different registered LWM2M client devices into groups, as will be described further below.

In one embodiment, the processing unit 35 of the relay module 30 is adapted to send a register request message via the first interface module 31 to at least one of the one or more server devices 20, requesting to register with the server device 20. If successful, the processing unit 35 may receive server information comprising, for example, at least one of: a list of the capabilities of the server 20, and/or a list of client requirements for the server to provide service to a client.

A relay module 30 can therefore register with one, or a plurality of server devices 20, and then gain knowledge of the capabilities and preferences of each server (which can then be used to automatically allocate a client device 10 when a client device subsequently tries to register with the relay node 30). In one example, this type of registration can be carried out during an initial set-up phase, e.g. when a new relay module is added to a network, or when a new server 20 is added to a network, or at periodic intervals to enable a relay module to have current information regarding the capabilities and requirements of each of the servers the relay module is associated with. In such an embodiment a relay module effectively registers with a server device, and requests this information from a server device.

The registration of a relay module 30 with a server device 20 may be performed, for example, once a relay module 30 has completed a bootstrapping procedure to identify the different LWM2M server devices, for example the different server devices that it may be associated with. A relay module 30 can register and de-register itself from a LWM2M server device (since the relay module is effectively seen as a client device, and client devices have this authorization to register and de-register with a server, for example as shown above in Table 1, whereby it can be seen that both a registration and a de-registration are performed in an uplink direction from a client device to a server device).

In one example a relay module 30 can register to a server device 20 by sending a REGISTER message to that server, as will be described later in the application.

If the registration to the server device 20 is successful, the server device 20 responds to the relay module 30, for example using a piggybacked 2.01 Created response message. Besides such an acknowledgement message, the server device 20 can provide additional information relating to the server, such as a lists of the capabilities of the server. In addition, the server device 20 can inform the relay module 30 as to which type of LWM2M client devices it would like (or is able) to provide service to.

The following is an example of a message response from a REGISTER message sent from a relay module 30 to a server device 20, with the following being received from the server device (the payload shown in JSON format in this example):

```
2.01 Created
{
"Capabilities": [
    {"Bandwidth": 64},
    {"Storage": 3Mb},
    {"Redundancy": No},
    {"Supported Object": ["3","5","8"]}
],
"Client-Requirements": [
    {"OS": 3.1},
    {"Client": contiki}
]
}
```

From the above it can be seen that, in this example, the message received from the server device 20, in response to the register request, includes the capabilities of the server device 20, and the client requirements of the server. For example, the capabilities of a server may comprise the bandwidth of the server device, the storage available per user, the redundancy in power supply or storage, the security of the server device or the objects supported by the server device. It is noted that other capabilities may also be conveyed or used. The client requirements, for example, can refer to the operating system that client devices are required to have for the server device to service them, or the version of their operating systems. In other words, a server device 20 can impose a requirement that only client devices having a certain operating system may form part of its management group. It is noted that other capabilities and other client requirements may also be used.

In the embodiment above a relay module obtains the capabilities and requirements of a server device in response to sending a register request message.

Although the example above shows a server device sending information to a relay module in response to a successful registration of the relay module with the server device, it is noted that a relay module does not necessarily require information from the server device. For example, a server device may register the relay module with an "empty" response message, in which case a relay module can estimate or guess the best groups for client devices.

In addition, or alternatively, a server device 20 can define its own capabilities and/or requirements into a relay module 30, such that a relay module can register and distribute automatically the LWM2M client devices among the most suitable LWM2M server devices.

In such an embodiment the processing unit 35 of the relay module 30 may be adapted to receive, via the first interface module 31, server information comprising at least one of: a list of the capabilities of the server, a list of client requirements for the server to provide service to a client, and information for creating a group object for managing a group of clients. This has an advantage of allowing a server device to update its information in a relay module at any point. For example, a server device can update its capabilities, the requirements for the new registered clients and can create groups to manage its clients more easily.

The following is an example of WRITE message from a server device 20 to a relay module 30, with the payload in JSON format:

```
WRITE /information
{
"Capabilities": [
    {"Bandwidth": 64},
    {"Storage": 3Mb},
    {"Redundancy": No},
    {"Supported Object": ["3","5","8"]}
],
"Client-Requirements": [
    {"OS": 3.1},
    {"Client": contiki}
],
"Group-Management": [
    {"ClientList": [91058, 260890, 210995]},
    {"ResourceList":["/6/5/","4/0/6", "/7/0/3"]}
]
}
```

In the example above a server device 20 can influence or dictate how groups of client devices are to be formed. Such an embodiment also allows a server to update its information in a relay module at any point, i.e. not just upon a register request from a relay. However, as will be described below, in some embodiments groups of client devices can be created automatically by a relay module 30.

Next, there will be described the registration of client devices 10 with a relay module 30.

According to one embodiment, the processing unit 35 is adapted to receive, via the second interface module 33, a request from a client device 10 to register with a server. The processing unit 35 may be adapted to automatically select a server from the one or more server devices 20 based on a predefined policy for creating a group object. In addition, or alternatively, the processing unit 35 may be adapted to automatically select a server from the one or more server devices 20 by matching the capabilities and/or requirements of a server with the capabilities and/or requirements of a client device.

In this way, when a new client device 10 tries to register to a new server, it is either automatically allocated to a server by the relay module 30, for example after the relay has acquired sufficient knowledge about the capabilities and/or requirements of the servers it has already registered with to gain this knowledge, or according to a predefined policy, e.g. during an initial stage before the relay module has registered with sufficient servers, or before a relay module has gained sufficient knowledge of the servers.

Once a client device 10 is assigned to a specific server device 20 and a particular group object instance (i.e. set of group management), the relay module 30 can respond to the client device 10, for example with a correspondent CoAP success code or, in the case of failure, with an appropriate error code.

From the above it can be seen that, in one example, after a client device has completed a bootstrap procedure it will register with a relay module, for example, following a client registration interface flow as defined in the standards for when a client device registers with a server device. However, instead of registering directly with a server, the client device registers with a second interface module 33 of a relay module 30, which can be an interface having a LWM2M server implementation. The registration may be performed by a LWM2M client device sending a "Register" operation to the relay module 30. Once the relay module 30 receives the register message, the relay module will select a server device, for example automatically from among the most suitable available server devices, and insert the LWM2M client device in a specific group object associated with that LWM2M server device.

In one embodiment, once a relay module has created a group object relating to a particular server device and a group of client devices, the processing unit 35 can be adapted to inform the selected server device, via the first interface module 31, of the creation of a group object relating to a group of client devices.

Since a LWM2M server device can distribute its LWM2M client devices in groups, this can enable a server device to manage a set of clients at the same time, instead of managing each LWM2M client device one by one as specified in the technical specification relating to "Lightweight Machine to Machine Technical Specification", Candidate Version 1.0, 10 Dec. 2013, OMA-TS-LightweightM2M-V1_0-20131210-C. As mentioned above, according to a predefined policy, a relay module can group automatically the LWM2M client devices of a LWM2M server without the intervention of the LWM2M server.

In one embodiment a relay module 30 may be adapted to automatically register and update the registration of the LWM2M client devices, which has the advantage of easing the load of the LWM2M server devices and reducing the network traffic.

A relay module 30 can register and distribute the client devices 10 among the most suitable LWM2M server devices, for example to distribute the workload across multiple LWM2M server devices.

A relay module 30 can automatically define and create groups of LWM2M client devices. By doing this, an administrator of a LWM2M server device can manage the LWM2M client devices in groups.

In a LWM2M network a bootstrap server can assist with directing a client device to a server device for service. According to an embodiment of the invention, after a LWM2M client device has completed a bootstrap procedure with a bootstrap server, the bootstrap server can be configured to direct the client device to register with a relay module, instead of directly with a server device. As mentioned above, the relay module will assign a LWM2M server device to the LWM2M client device, for example according to the LWM2M server capabilities and/or client requirements, and will allocate that LWM2M client to a group object (management group), thus making it easier for the LWM2M server device to manage the LWM2M client device.

As mentioned above, the relay module will register to the LWM2M server device as well. The LWM2M server device is therefore able to provide the relay module with its capabilities and its own requirements for accepting the client device. The relay module can use that information to distribute the LWM2M client devices among the different LWM2M servers.

Figure 3:
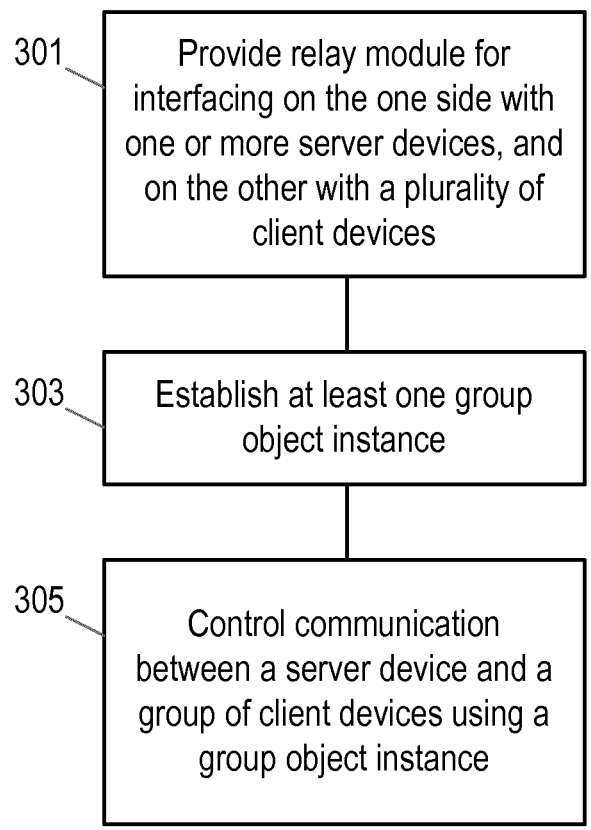
FIG. 3 shows a method according to an embodiment of the present invention.

FIG. 3 shows a method according to an embodiment of the present invention, of managing client devices in a lightweight machine to machine (LWM2M) communication network. The method comprises providing a relaying module for interfacing on the one side with one or more server devices, and on the other with a plurality of client devices, step 301. At least one group object instance is established, step 303, and communication between a server device and a group of client devices controlled using a group object instance, step 305. In the method each group object may define a relationship between a group of client devices and a server device.

In one embodiment the method comprises receiving a request to register from a client device, and automatically registering the client device with a particular server device based on one or more of: a predefined policy for creating a group object; or by automatically matching the capabilities and/or requirements of a server with the capabilities and/or requirements of a client device.

Figure 4:
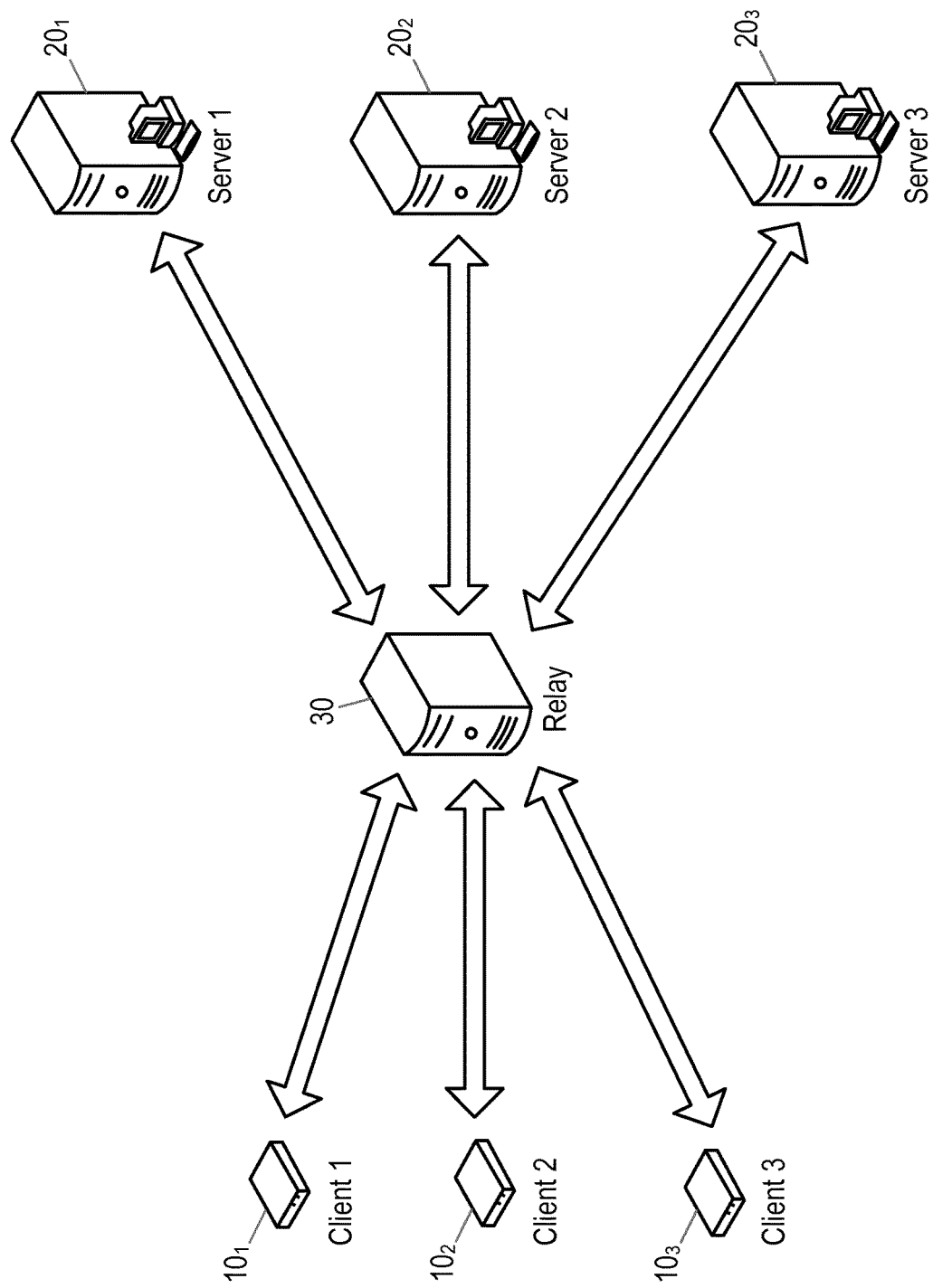
FIG. 4 shows an example of a network according to an embodiment of the present invention.

FIG. 4 shows an example of a network according to an embodiment of the present invention. In FIG. 4 a relay module 30 according to an embodiment of the present invention is shown as being coupled to a plurality of client devices 10 and a plurality of server devices 20, such as LWM2M client devices and LWM2M server devices. The relay module 30 may be configured to manage a group of client devices as described herein. It is noted that although FIG. 4 shows the relay module being interposed between the client devices 10 and server devices 20, in one example the relay module 30 may form part of a client device 10 or server device 20.

Figure 5:
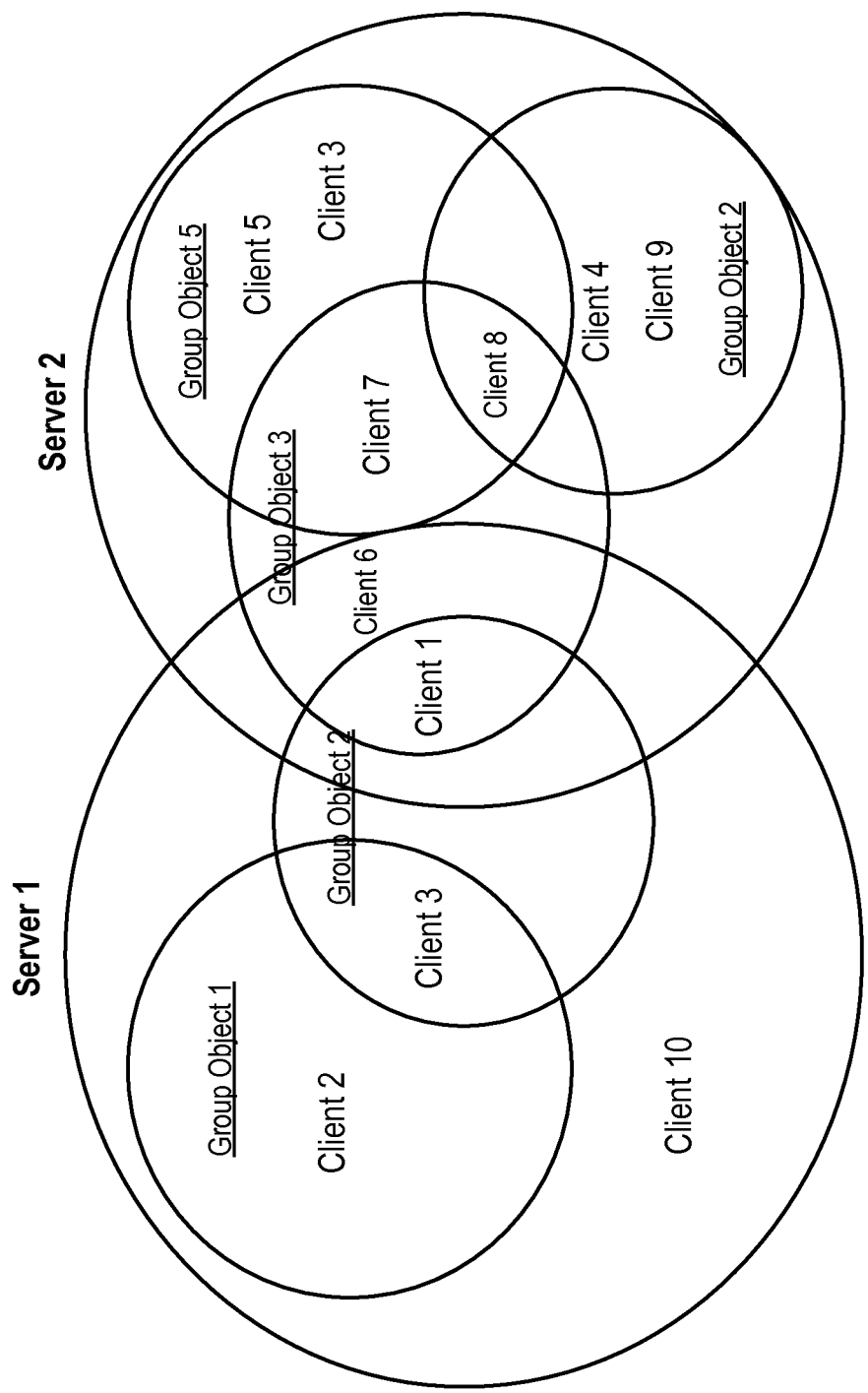
FIG. 5 shows an example of group object instances in an example scenario.

FIG. 5 shows an example of how group objects may be established for various client devices, and for different server devices. In the example of FIG. 5, first and second server devices are represented as Server 1 and Server 2, which are registered to a relay module (not shown). FIG. 5 therefore represents an example of the type of information that may be stored in a relay module. This information may be represented as a graph and, following that information, the relay module can manage the different clients and servers attached to it.

Server 1, for example, comprises two group objects (Group Object 1 and Group Object 2), while Server 2 in this example has three group objects (Group Object 3, Group Object 4 and Group Object 5). The different client devices registered to the relay module are distributed among the two servers. Some client devices (for example client devices 7 or 8) belong to different group objects in the same server (client device 7 belonging to Group Object 3 and Group Object 5, and client device 8 belonging to Group Object 3, Group Object 4 and Group Object 5). Other client devices, (for example client device 10) do not belong to any group object. Some client devices (for example client devices 1 and 6) belong to group objects which use the capabilities of both servers.

The client devices and group objects may be modified at any time. A relay module may be adapted to keep the state of all the client devices, servers and group objects.

Figure 6:
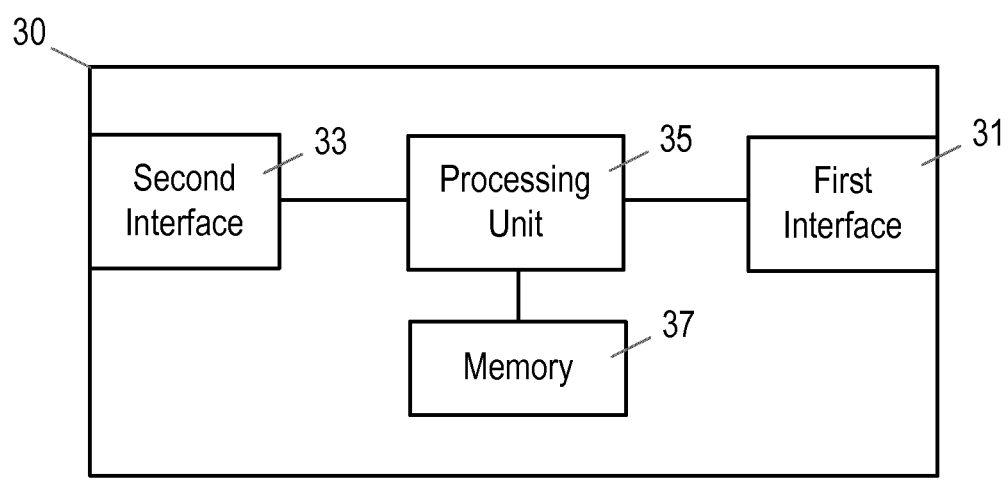
FIG. 6 shows an example of a relay module according to another embodiment of the present invention.

Referring to FIG. 6, in one embodiment a relay module 30 may comprise a memory 37 for storing information, including for example information relating to which server devices 20 are registered to the relay module 30, which group objects are associated with each relay module 30, which group objects are associated with each server device 20, and which client devices 10 are associated with each group object. In this way a relay module 30 is able to store a current status of the relationships in the group's management structure, for example storing the details relating to the type of relationships illustrated in the example of FIG. 5.

In one embodiment a group object can be modified automatically by a relay module without the involvement of any LWM2M server device.

A relay module can base the creation or the modification of a group object (management group) on its own decisions or criteria. However, in the event that a LWM2M server device wishes to deny providing services to a particular client device, the relay module can be adapted to provide a different LWM2M server device to that LWM2M client device.

After a relay module has registered LWM2M client devices to one or more server devices using one or more group objects, a LWM2M server device is able to send messages through the relay module to a specific client or a group of clients using the group objects (i.e. using the group management feature).

Figure 7:
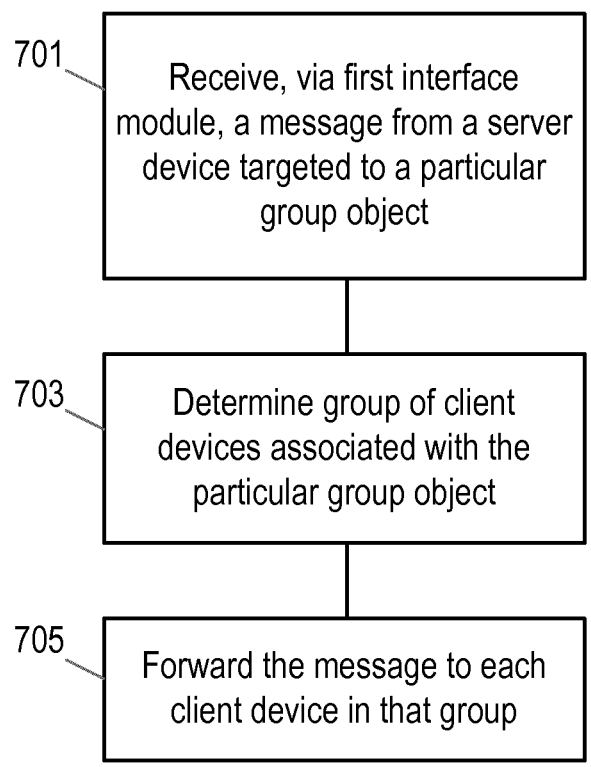
FIG. 7 shows a method according to an embodiment of the present invention.

For example, referring to FIG. 7, in one embodiment the processing unit 35 of a relay module is adapted to receive, via the first interface module 31, a message (for example a management message) from a server device targeted to a particular group object, step 701. In step 703, the processing unit 35 determines which group of client devices are associated with the particular group object, and forwards the message to each client device in that group, step 705. The message may be forward to each of the client devices via the second interface module 33.

This has an advantage of enabling a server device to manage a group of client devices by sending a single message, which is then distributed by the relay module to each of the client devices associated with a group object. The relay module is then able to perform the tasks of communicating with each client device, rather than these tasks being performed by a server.

For example, a management message which has as destination a Uniform Resource identifier (URI) of a group object instance will be a message which affects the entire communication group.

Thus, the method described above in relation to FIG. 3 may further comprise the steps of receiving a message from a server device targeted to a particular group object, determining which group of client devices are associated with the particular group object, and forwarding the message to each of the client devices in that group.

A relay module is also able to assist with processing or handling messages coming the other way.

Figure 8:
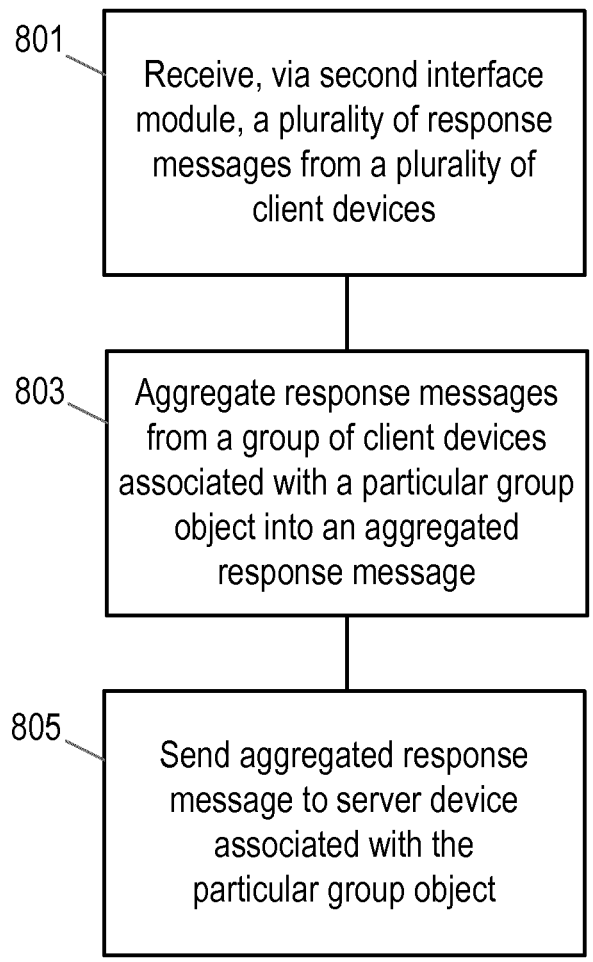
FIG. 8 shows a method according to an embodiment of the present invention.

For example, referring to FIG. 8, in one embodiment a processing unit 35 of a relay module 30 is adapted receive, via the second interface module 33, a plurality of response messages from a plurality of client devices (for example a plurality of information reporting messages). The response messages from a group of client devices associated with a particular group object are aggregated into an aggregated response message, with the aggregated response message being sent to a server device associated with the particular group object. The aggregated response message may be sent to a server device via the first interface module 31.

This has an advantage of enabling a relay module to receive multiple response messages, and then aggregate them into a single response message for a group object, which is then sent to the relevant server.

Thus, the method described above in relation to FIG. 3 may further comprise the steps of receiving a plurality of response messages from a plurality of client devices, aggregating the received response messages from a group of client devices associated with a particular group object into a single aggregated response message, and sending the aggregated response message to a server device associated with the particular group object.

Figure 9:
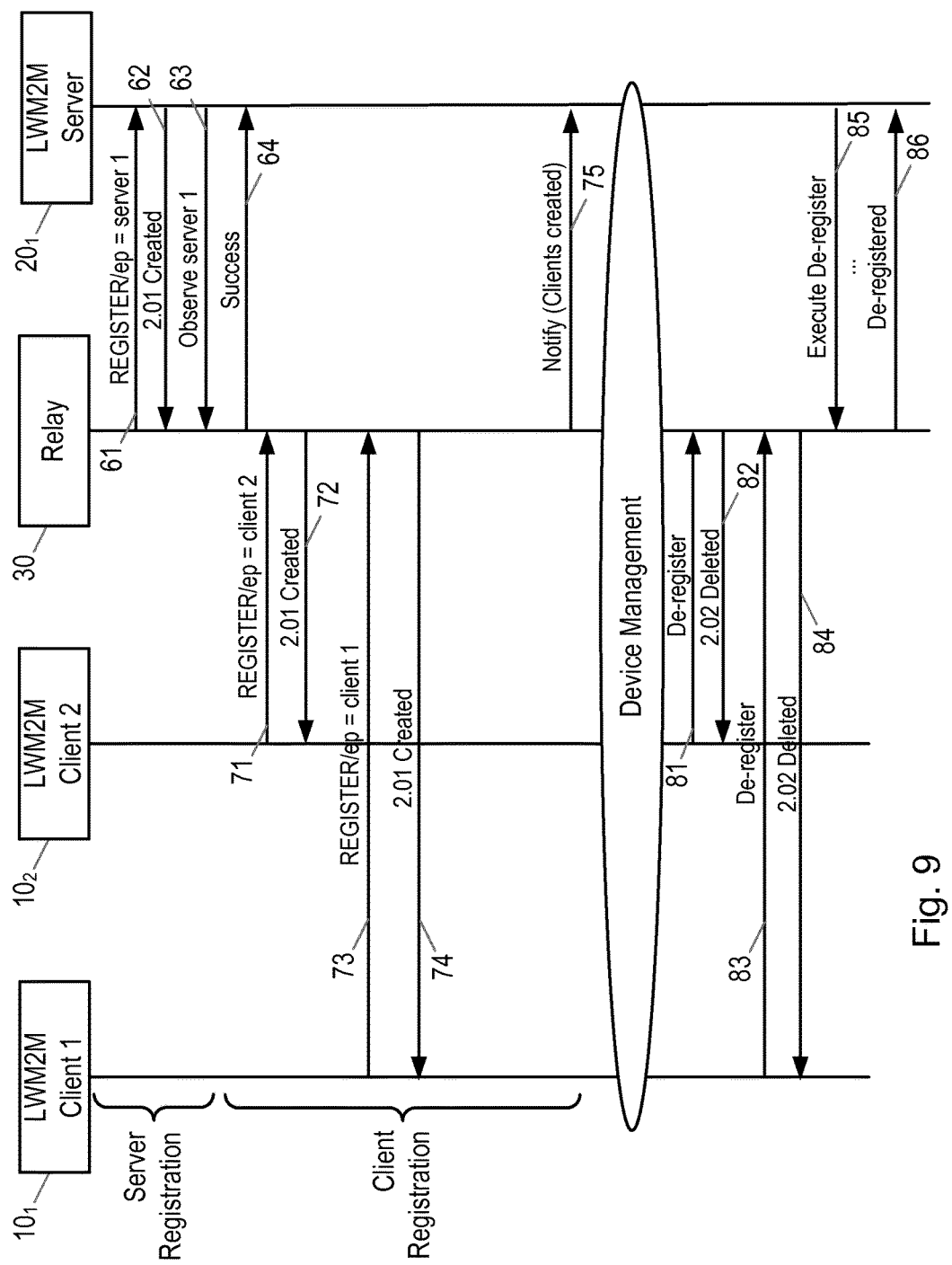
FIG. 9 illustrates a signalling diagram providing an example of communication signals interchanged between different nodes.

FIG. 9 shows an example of a signaling diagram, and in particular of the Update and De-registration operations that may be performed as defined in a client registration interface flow of.

Referring to FIG. 9, once a LWM2M server device 20 is associated or registered with a relay module 30, e.g. added into the relay, the LWM2M server device 20 (for example using the information Reporting Interface described in the Technical Specification referred to above, i.e. version V1_0-20131210-C) can initiate an observation request (e.g. via message 63) for changes of all its own object instances in the relay module 30. If accepted by the relay module 30, a Success message 64 may be sent to the server device 20. This means that the relay module 30 is able to inform the LWM2M server device 20 about the new LWM2M client devices registered to it, or the new group management created on behalf of itself from the relay module 30. For example, in FIG. 9 it is shown that Client 2 (i.e. client device 10$_2$) sends a register request message to the relay module 30 (i.e. Register message 71). Once the client device 10$_2$ is assigned by the relay module 30 to a specific server (e.g. server device 20 in this example) and a particular group object instance, the relay module 30 responds to the client device 10$_2$, for example with a corresponding CoAP success code or, in the case of failure, with an appropriate error code. For example, the relay module 30 may send a Created message in response (i.e. message 72) confirming to the client device 10$_2$ that it has been registered with the relay module. As noted above, the relay module 30 can automatically select a server based, for example, on capability and/or requirement information, or according to a predefined policy. A client may be informed that it has been assigned to a group, although this is not necessary since the groups are effectively formed to benefit the servers, to make it easier for servers to manage client devices. The groups are dynamic and can change over time.

In a similar manner to the above, FIG. 9 shows that Client 1 (i.e. client device $10_1$) sends a register request message to the relay module 30 (i.e. Register message 73), with the relay module 30 sending a Created message in response (i.e. message 74) confirming to the client device $10_1$ that it has been registered with the relay module. Again, the relay module 30 can automatically select a server (server 20 in this example), for example based on capability and/or requirement information, or according to a predefined policy.

In the example of FIG. 9, the relay module 30 then sends a Notify message to the server device 20, e.g. Notify message 75, informing the server device 20 which clients have been created, and which client devices relate to a specific group object.

FIG. 9 also shows examples of device management. For example, messages 81 and 82 relate to de-registration, and show client device $10_2$ requesting to be de-registered from the relay module 30 (i.e. in message 81), with the relay module 30 confirming de-registration with a 2.02 Deleted message (i.e. message 82). Likewise, messages 83 and 84 also relate to de-registration, and show client device $10_1$ requesting to be de-registered from the relay module 30 (i.e. in message 83), with the relay module 30 confirming de-registration with a 2.02 Deleted message (i.e. message 84).

FIG. 9 therefore shows client devices de-registering from the relay module 30 in a normal manner, i.e. from "below" in the sense of the relay module acting as a server to the client devices, the de-registration being on an uplink from a client device to the relay module 30 (as noted earlier in relation to Table 1), i.e. de-registration messages 81 and 83.

According to another aspect, in one embodiment a server device 20 can trigger a de-registration, i.e. whereby de-registration is triggered from "above", or in a downlink direction, rather than from "below", as illustrated by the de-registration trigger message 85.

It is noted that a server device can de-register from the relay module 30 at any time. In this case, the client devices which are being handled by the de-register server device can be automatically moved to different server devices. It is noted that a server device may also send a de-register trigger signal directly to a client device, for example a client device which is not part of a group object.

Thus, although the current OMADM specification does not support a server device to de-register from a client device, according to one embodiment of the present invention a server device, such as a LWM2M server device, is adapted to send or execute a de-registration trigger to a client device, for example a relay module 30. In response to a de-registration trigger being executed, for example a client device such as the relay module 30 receiving a de-registration trigger, the client device or relay module 30 performs a de-registration operation with the server device. As such, in response to receiving a de-registration trigger from above or in a downlink direction, a de-registration operation is then carried out from below, or in the uplink direction.

This de-registration in response to a de-registration trigger signal received in a downlink signal, can be particularly advantageous where multiple client devices are connected to a relay module. The de-registration trigger signal can be sent in any format or protocol, for example using a CoAP or HTTP message.

Figure 10A:
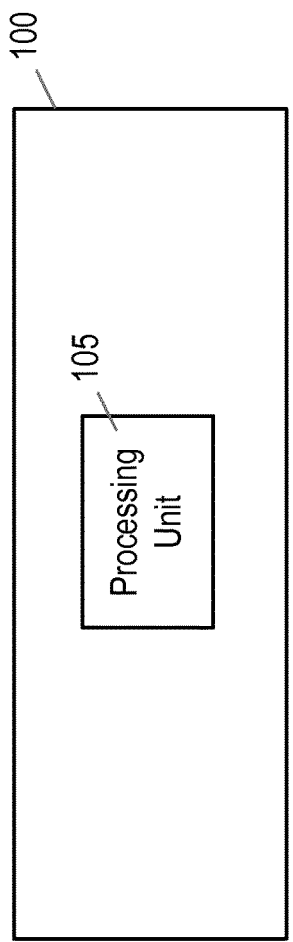
FIG. 10a shows an example of a bootstrap server according to an embodiment of the present invention.

FIG. 10a shows an example of a bootstrap server 100 for use in a LWM2M communication network. The bootstrap server comprises a processing unit 135 configured to receive a register request from a client device, and direct the register request from the client device to a relay node, for enabling the relay node to act as an interface between a server device and a plurality of client devices.

A relay module can use a bootstrap server to know or learn about the existence of the servers, for example such that a relay module can determine which server(s) it should send register requests to.

Figure 10D:
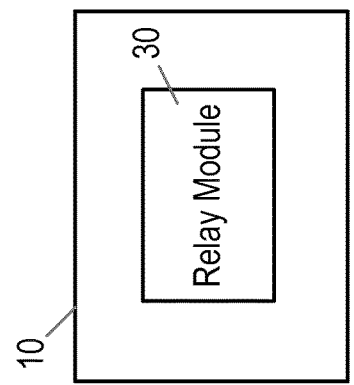
FIG. 10d shows an example of a client device according to an embodiment of the present invention.
Figure 10C:
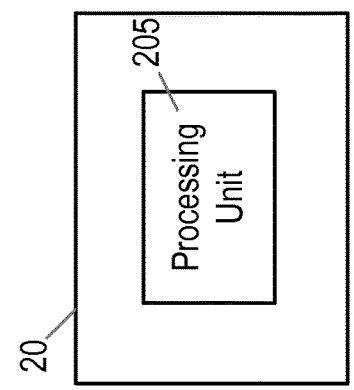
FIG. 10c shows an example of a server device according to an embodiment of the present invention.
Figure 10B:
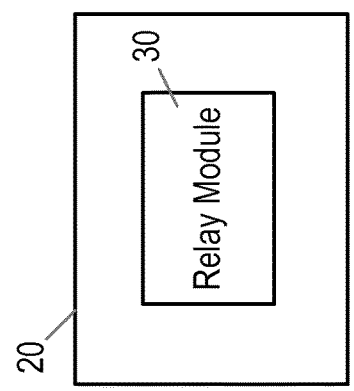
FIG. 10b shows an example of a server device according to an embodiment of the present invention.

FIG. 10b shows an example of a server device 20 according to an embodiment of the present invention. In one embodiment the server device 20 comprises a relay module 30 as described herein, and as claimed in the appended claims.

FIG. 10c shows a server device 20 according to another embodiment, for use in a lightweight machine to machine (LWM2M) communication network. The server module 20 comprises a processing unit 205. The processing unit 205 is adapted to receive a register request message from a client device, determine if the client device is a relay module capable of handling a group of client device, and if so, send server information to the relay module, for enabling a relay module to group client devices.

The processing unit 205 may be adapted to manage a group of client devices, for example a group that has been automatically established by a relay module, by sending a single message to the relay module which is intended for multiple client devices. Likewise, the processing unit 205 may be adapted to receive a single message from a relay module, the single message being an aggregated message from multiple client devices.

FIG. 10d shows an example of a client device 10 according to an embodiment of the present invention. The client device 10 comprises a relay module 30 as described herein, and as claimed in the appended claims. A client device may be adapted to receive a message from a relay module, whereby the message relates to a group message that is being sent by the relay module to at least one other client device.

The embodiments described above provide a mechanism for the creation of group management through a relay module, without requiring the intervention of an administrator. The embodiments provide a mechanism to distribute the LWM2M clients among the most suitable LWM2M servers. In one embodiment a relay module can automatically assign different clients to one or more servers.

The embodiments described herein provide an extension of the LWM2M protocol to add more parameters into the client registration operations.

A relay module according to an embodiment above enables the management in an Internet of Things (IoT) to be scaled, which is made possible by creating a hierarchy of LWM2M server devices.

The embodiments of the invention provide a natural way of extending a LWM2M protocol using a relay entity, and can take advantage of the LWM2M Device Management and Client Registration Interfaces.

A relay module, according to an embodiment of the invention, is a node that contains both LWM2M client and server implementations and is the gateway between a managing LWM2M server and LWM2M clients, sending messages to all members of a Group.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in

The invention claimed is:

1. A relay module for use in a lightweight machine to machine (LWM2M) communication network, the relay module comprising:
   a first interface for receiving a message transmitted by a first server device, wherein the message comprises a first group identifier;
   a second interface for interfacing with a plurality of client devices, wherein the second interface is distinct from the first interface; and
   a processing unit adapted to:
      use the first group identifier to identify a first group of client devices, the first group of client devices comprising a first client device and a second client device; and
      employ the second interface to forward the message to each client device included in the first group of client devices.

2. The relay module of claim 1, wherein the processing unit is adapted to send a register request message via the first interface to the first server device requesting to register the relay module with the first server device.

3. The relay module of claim 2, wherein following a successful registration with the first server device, the relay module is adapted to receive server information comprising at least one of:
   a list of the capabilities of the first server device; or
   a list of client requirements for the first server device to provide service to a client.

4. The relay module of claim 1, wherein the processing unit is adapted to receive, via the first interface module, server information comprising at least one of:
   a list of the capabilities of the first server device;
   a list of client requirements for the first server device to provide service to a client; or
   information for creating a group object for managing a group of clients.

5. The relay module of claim 1, wherein
   the first interface is operable to interface with a plurality of server devices comprising the first server device,
   the second interface is operable to receive a request to register with a server device from a client device, and
   the processing unit is adapted to select a server device from the plurality of server devices based on:
      a predefined policy for creating a group object; or
      matching one or more of the capabilities and requirements of a server included in said plurality of server devices with one or more of the capabilities and requirements of a client device.

6. The relay module of claim 5, wherein the processing unit is adapted to inform the selected server device, via the first interface, of a creation of a group object relating to a group of client devices.

7. The relay module of claim 1, wherein the relay module comprises a memory for storing at least one of:
   a list of server devices registered with the relay module;
   a list of group objects associated with the relay module;
   a list of which group objects are associated with the first server device; or
   a list of which client devices are associated with each group object.

8. The relay module of claim 1, wherein
   the first server device is configured to include a first group object and a second group object,
   the first group of client devices belongs to the first group object,
   a second group of client devices different from the first group of client devices belongs to the second group object,
   the first group identifier is associated with the first group object, and
   a second group identifier different from the first group identifier is associated with the second group.

9. The relay module of claim 1, wherein
   the second interface is configured to receive a plurality of response messages from a second group of client devices, and
   the processing unit is configured to:
      aggregate the plurality of response messages from the second group of client devices associated with a particular group object into a single aggregated response message; and
      send the aggregated response message to a server device associated with the particular group object.

10. The relay module of claim 1, wherein
    the first interface is configured to receive a de-register trigger message from a server device associated with a second group of client devices, and
    the processing unit is configured to:
       initiate a de-registering operation with the server device; and
       allocate the second group of client devices to one or more other server devices.

11. The relay module of claim 1, wherein the relay module forms part of a relay node, or forms part of a network node located between a server device and a client device, or forms part of a server device, or forms part of a client device, or forms part of a client device within a group of client devices associated with a group object.

12. The relay module of claim 1, wherein the relay module comprises a memory storing information specifying that the first client device and the second client device are assigned to the first server device.

13. A method of managing client devices in a lightweight machine to machine (LWM2M) communication network, the method comprising:
    receiving a first message transmitted by a first server device, wherein the first message comprises a first group identifier;
    using the first group identifier to identify a first group of client devices, the first group of client devices comprising a first client device and a second client device; and
    forwarding the first message to each client device included in the first group of client devices.

14. The method of claim 13, further comprising:
    receiving a second message including a second group identifier from the first server device;
    using the second group identifier to identify a second group of client devices among the plurality of groups of client devices; and
    forwarding the second message to the identified second group of client devices, wherein
    the first group identifier and the second group identifier are different, and
    the first group of client devices and the second group of client devices share one or more client devices.

15. The method of claim 13, comprising:
receiving a request to register from a client device; and
registering the client device with a particular server device based on one or more of:
- a predefined policy for creating a group object; or
- matching the capabilities and/or requirements of a server with the capabilities and/or requirements of a client device.

16. The method of claim 13, wherein
the first server device comprises a first group object and a second group object,
the first group of client devices belongs to the first group object,
a second group of client devices different from the first group of client devices belongs to the second group object,
the first group identifier is associated with the first group object, and
a second group identifier different from the first group identifier is associated with the second group.

17. The method of claim 13, comprising:
receiving a first response message from a first client device;
receiving a second response message from a second client device, wherein the first client device and the second client device are members of a group of client devices associated with a particular group object;
aggregating the received first and second response messages into a single aggregated response message; and
sending the aggregated response message to a server device associated with the particular group object.

18. The method of claim 13, further comprising:
for each server included in a group of two or more servers, receiving client requirement information transmitted by the server;
receiving a registration request transmitted by a client device, the registration request comprising configuration information indicating a configuration of the client device; and
selecting a particular server from the group of servers based on the requirement information transmitted by the particular server and the configuration information transmitted by the client device, wherein selecting the particular server based on the requirement information transmitted by the particular server and the configuration information transmitted by the client device comprises determining that the configuration information transmitted by the client device matches the requirement information transmitted by the particular server.

19. The method of claim 18, further comprising:
after selecting the particular server, identifying a group object instance associated with the particular server; and
after identifying the group object instance associated with the particular server, adding to the group object instance an identifier identifying the client.

20. A server device for use in a lightweight machine to machine (LWM2M) communication network, the server device comprising:
an interface for receiving a register request message from a client device; and
a processing unit adapted to:
determine if the client device comprises a relay module capable of handling a group of client devices; and
as a result of the processing unit determining that client device comprises the relay module, send, to the relay module, server information for enabling the relay module to group client devices.

21. The server device of claim 20, wherein the server information comprises client requirement information specifying a type of client to which the server is able to provide services.

22. The server device of claim 21, wherein the client requirement information specifying the type of client to which the server is able to provide services comprises operating system information identifying a particular operating system and/or client application information identifying a particular client application.

23. A bootstrap server for use in a lightweight machine to machine (LWM2M) communication network, the bootstrap server comprising:
an interface for receiving a first register request from a client device, and
a processing unit, coupled to the interface, configured to process the first register request and, after processing the register request, send to the client device an instruction to cause the client device to send a second register request to a relay node for enabling the relay node to select a server device and assign the client device to the server device.

* * * * *